July 26, 1960

C. T. SAMUELSON 2,946,566

SUBAQUEOUS DRILLING APPARATUS

Filed Aug. 31, 1956

INVENTOR
CHARLES T. SAMUELSON

BY *Stone, Boyden & Mack,*

ATTORNEYS

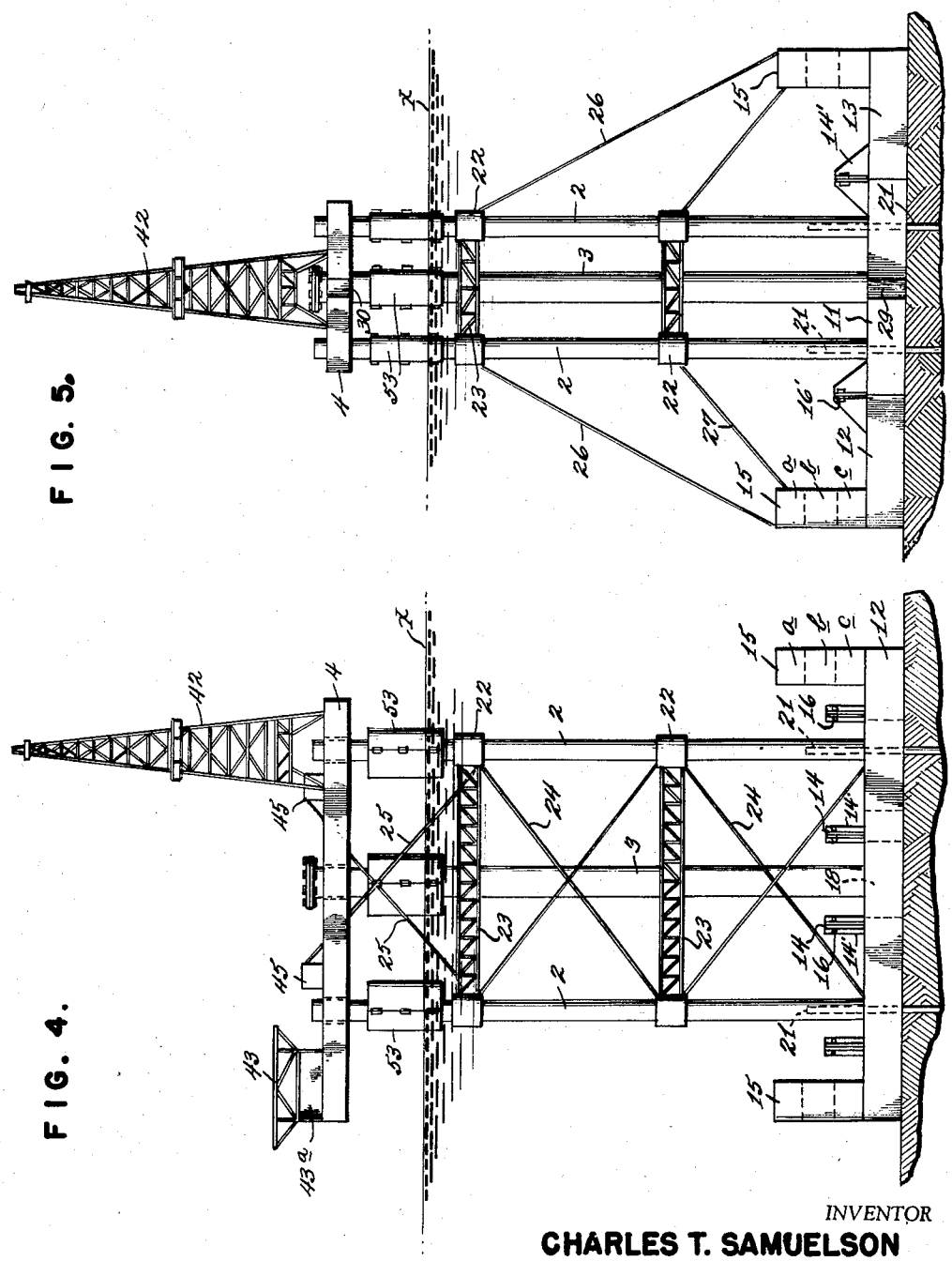

July 26, 1960 — C. T. SAMUELSON — 2,946,566
SUBAQUEOUS DRILLING APPARATUS
Filed Aug. 31, 1956 — 8 Sheets-Sheet 3
FIG. 6.
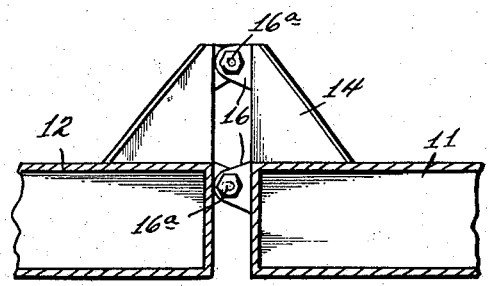
FIG. 8.
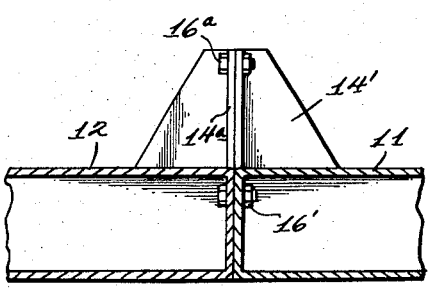
FIG. 7.
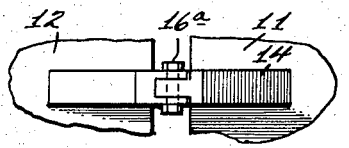
FIG. 25.
FIG. 26.
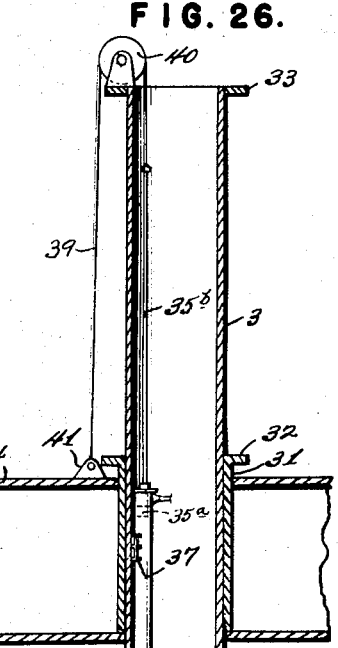
FIG. 27.
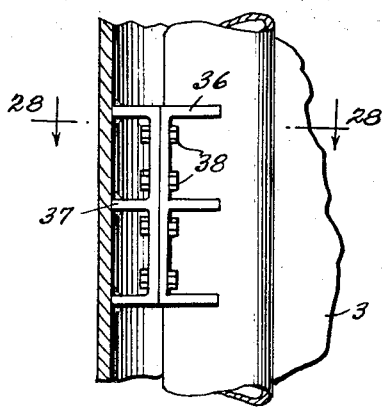
FIG. 28
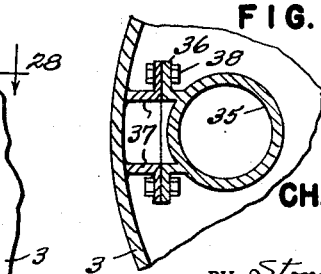
INVENTOR
CHARLES T. SAMUELSON
BY Stone, Boyden & Mack,
ATTORNEYS July 26, 1960　　　C. T. SAMUELSON　　　2,946,566
SUBAQUEOUS DRILLING APPARATUS
Filed Aug. 31, 1956　　　　　　　　　　8 Sheets-Sheet 4
FIG. 9.　　　FIG. 10.　　　FIG. 11.
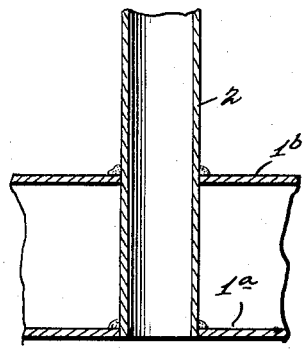
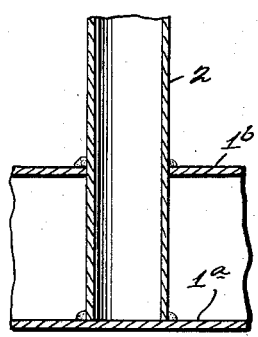
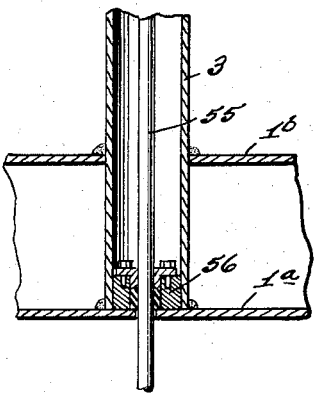
FIG. 12.　　　FIG. 13.
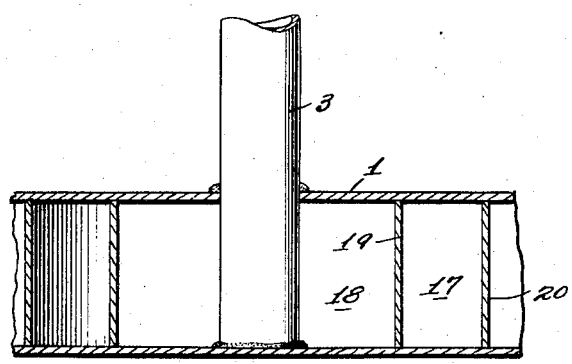
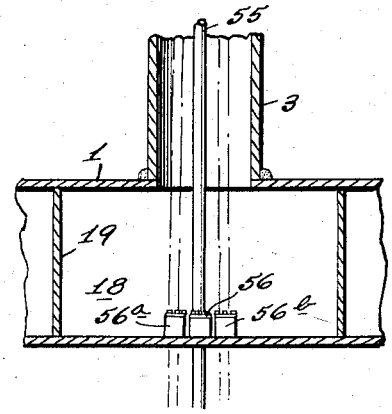
INVENTOR
CHARLES T. SAMUELSON
BY Stone, Boyden & Mack,
ATTORNEYS July 26, 1960   C. T. SAMUELSON   2,946,566
SUBAQUEOUS DRILLING APPARATUS
Filed Aug. 31, 1956   8 Sheets-Sheet 5
FIG. 14.
FIG. 15.
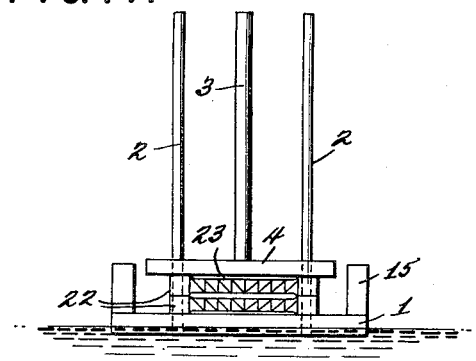
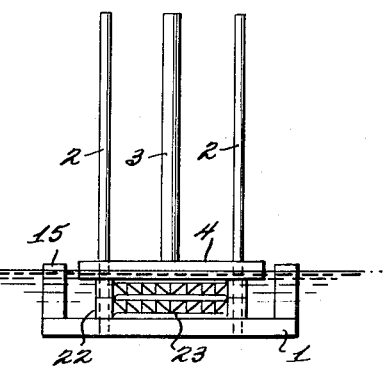
FIG. 34.
FIG. 16.
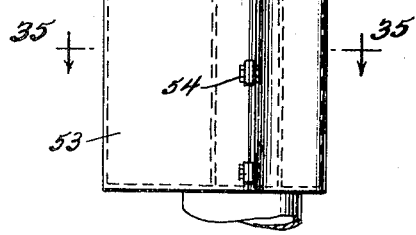
FIG. 35.
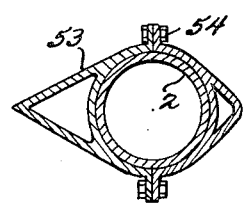
FIG. 32.
FIG. 31
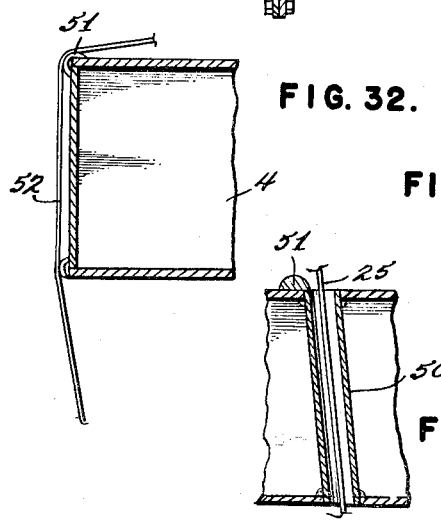
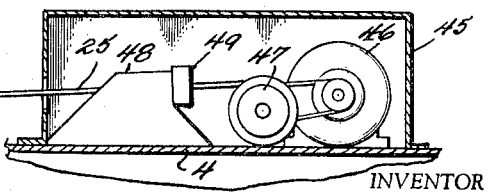
FIG. 33
INVENTOR
CHARLES T. SAMUELSON
BY *Stone, Boyden & Mack,*
ATTORNEYS July 26, 1960 C. T. SAMUELSON 2,946,566
SUBAQUEOUS DRILLING APPARATUS
Filed Aug. 31, 1956 8 Sheets-Sheet 6

INVENTOR
CHARLES T. SAMUELSON
BY *Stone, Boyden & Mack*
ATTORNEYS

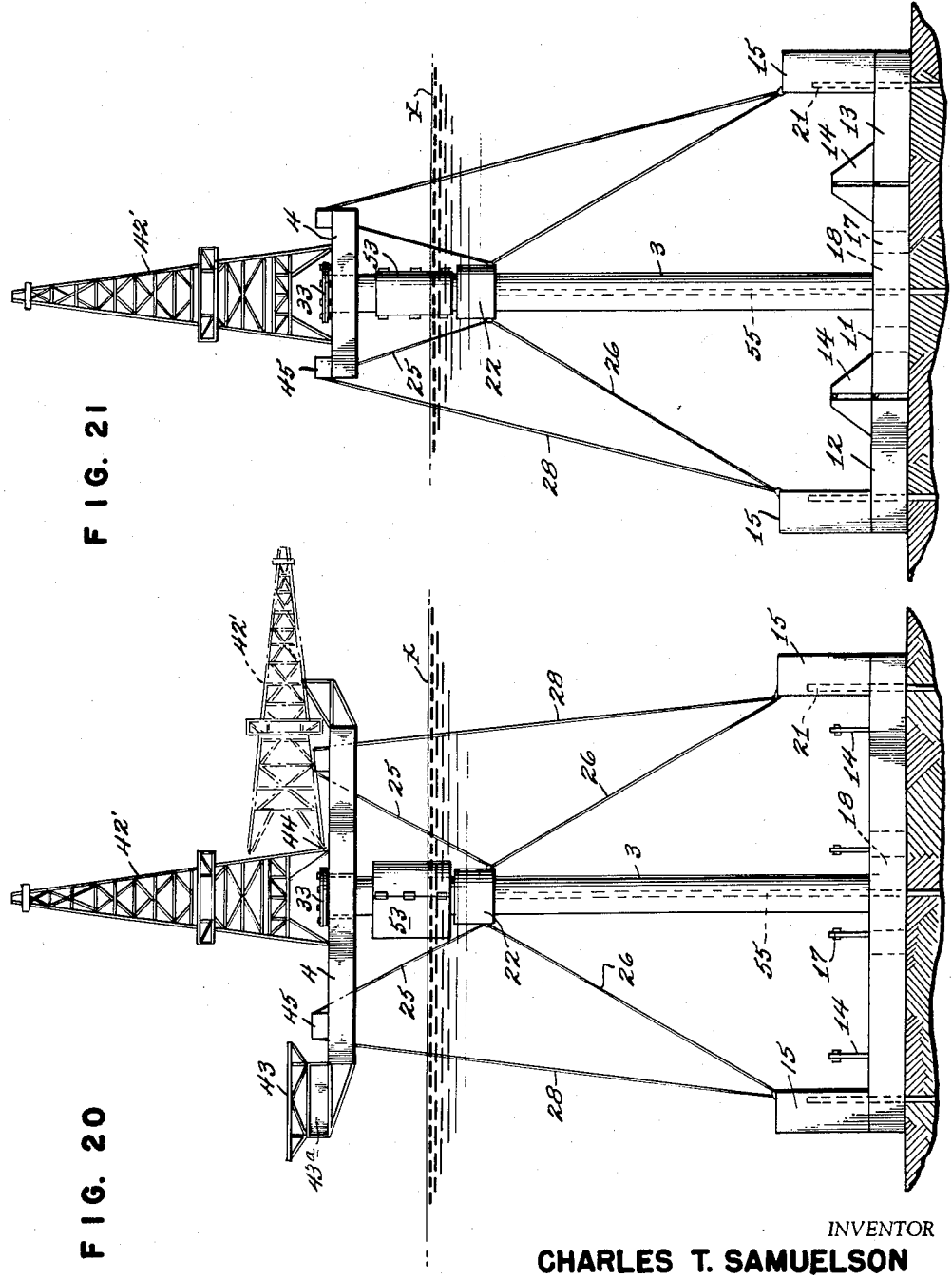

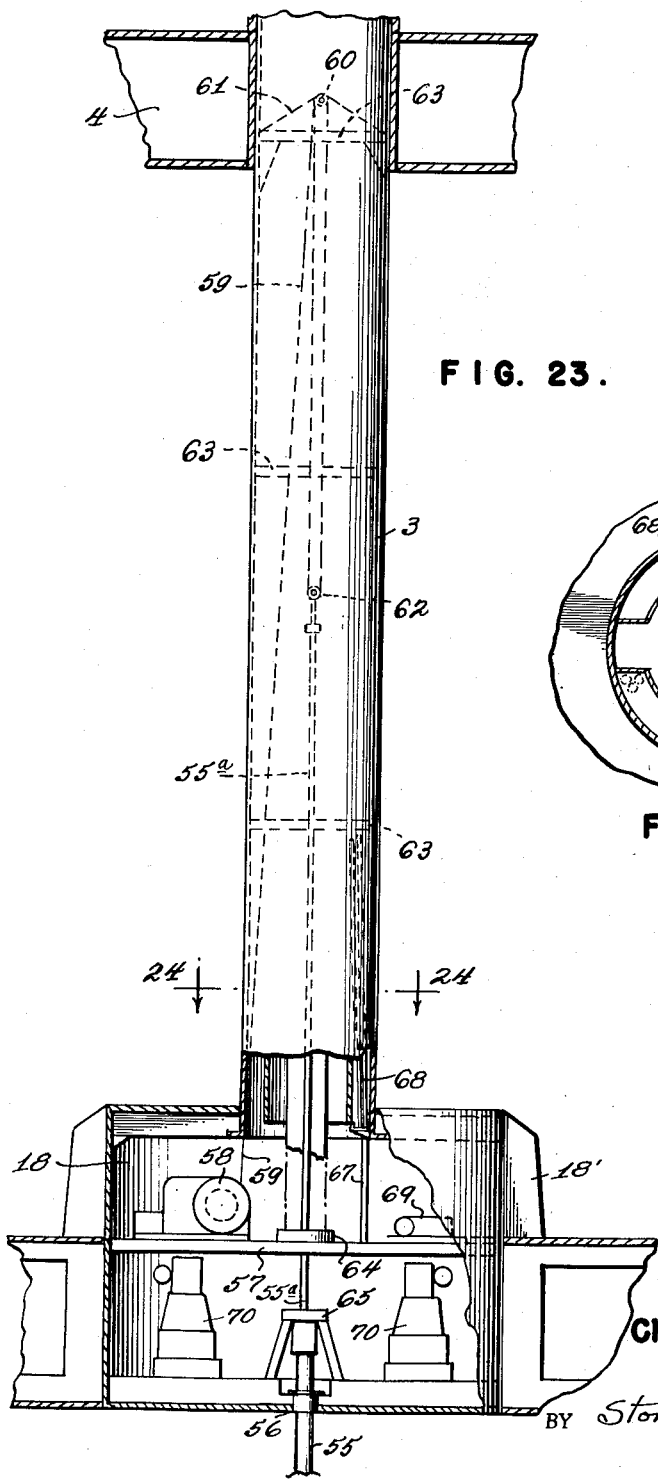
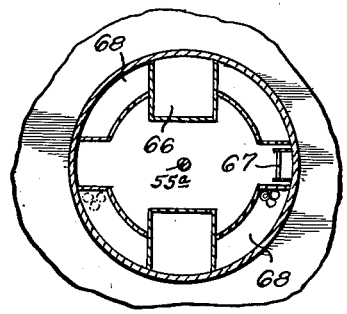
FIG. 23.
FIG. 24.
INVENTOR
CHARLES T. SAMUELSON
BY Stone, Boyden & Mack,
ATTORNEYS

United States Patent Office 2,946,566
Patented July 26, 1960

2,946,566

SUBAQUEOUS DRILLING APPARATUS

Charles T. Samuelson, 105 N. Burnett Drive,
Baytown, Tex.

Filed Aug. 31, 1956, Ser. No. 607,485

4 Claims. (Cl. 255—2.5)

This invention relates to floating units for use in subaqueous oil drilling and similar operations.

The present invention is in the nature of a further development of and improvement on the deepwater drilling apparatus disclosed in my prior Patent No. 2,589,146, issued March 11, 1952.

Such apparatus in general comprises a floatable, submersible anchoring or base structure, rigidly secured to which are one or more vertically extending columns, and an operating platform or barge supported by such column or columns above the water level, on which platform a drilling rig or derrick may be mounted.

In my said prior patent, the anchoring or base structure consisted of four separate barges, spaced a substantial distance apart, and each carrying one or more columns. In my present invention I provide a base structure consisting of a single rigid barge unit, such unit having an area larger than that of the operating platform, so as to afford the desired stability. Moreover, because of the fact that, due to its immense size, such a single structural unit cannot be accommodated in any existing dry dock, I have devised a base unit made up of a plurality of independent barge sections, normally disposed side by side, in substantial contact and rigidly connected, but capable of being separated, for drydock purposes.

An object of the invention is also to provide means for increasing the stability of the ground anchor barge as it is being submerged, and to this end I mount on top of such barge along the sides or corners thereof a plurality of buoyant wing tanks extending well above the top of the barge.

Another object is to provide improved bracing means for the column or columns, such means including a sleeve or sleeves freely slidable on the columns. More specifically, the invention contemplates the provision of buoyant sleeves to which the bracing is connected and which will automatically rise on the columns as the ground anchor barge is submerged.

Still another object of the invention is to devise improved means, mounted on the operating platform, for tensioning and holding cables connecting said platform with the slidable sleeves or with the ground anchor barge.

A still further object is to provide improved, hydraulically operated means for hoisting the platform barge above the water level to its proper position on the columns.

Yet another object of the invention is to devise means by which a drill stem may be disposed inside of a column and extend downwardly through the same and through the bottom of the ground anchor barge.

A still further object is to avoid the necessity of using a conventional derrick for operating the drill stem, and to this end the invention contemplates the provision of a water tight operating chamber at the bottom of a column, and the mounting wholly inside of said chamber and column of means for raising and lowering and for rotating said drill stem. Additionally, I propose to provide inside of such a column one or more elevator shafts for establishing communication between said operating chamber and the platform barge, and also to provide storage space within the column for drill pipe sections.

With the above and other objects in view, and to improve generally on the details of such apparatus, the invention consists in the construction and arrangements of parts hereinafter described and claimed, and shown, by way of illustration, in the accompanying drawings, forming part of this specification, and in which:

Fig. 4 is a side elevation of the complete drilling unit employing the form of ground anchor barge shown in Fig. 2, the parts being illustrated as in operative position ready for drilling.

Fig. 5 is an end elevation of the same.

Fig. 6 is a fragmentary view on an enlarged scale partly in side elevation and partly in section showing one means of connecting the sections of the ground anchor barge illustrated in Fig. 2.

Fig. 7 is a plan view thereof.

Fig. 8 is a view similar to Fig. 6 but showing a modified construction.

Figs. 9 and 10 are fragmentary vertical sections showing different methods of securing the trunk columns to the ground anchor barge.

Fig. 11 is a similar view showing how a drill stem and casing can be operated down through such a column.

Fig. 12 is a view similar to Fig. 10 but showing annular watertight compartments surrounding the column.

Fig. 13 is a view similar to Fig. 11 but showing how the drill stem and casing may be disposed at an angle.

Figs. 14, 15 and 16 are more or less diagrammatical elevational views on a small scale showing three successive positions of the parts making up the drilling unit, as the same is floated to location, then the ground anchor barge gradually submerged and finally the ground anchor barge firmly seated on the ocean bottom, with the operating barge afloat.

Figs. 20 and 21 are side and end elevations respectively, showing a drilling unit having only a single trunk column, and illustrating the drilling unit in operative position with the ground anchor barge resting on the bottom and the operating platform or barge raised above the water level.

Fig. 23 is a fragmentary view on an enlarged scale illustrating the column and parts of the ground anchor barge and platform barge, and illustrating how the drilling machinery may be housed within the same.

Fig. 24 is a horizontal transverse section on an enlarged scale, substantially on the line 24—24 of Fig. 23.

Fig. 25 is a detailed fragmentary vertical section through the upper end of one of the trunk columns such as illustrated in Fig. 22, illustrating means for supporting the operating platform thereon, parts being shown in elevation and parts being broken away.

Fig. 26 is a vertical section through a trunk column and a portion of the operating barge showing hydraulic means within the column for raising the operating platform.

Fig. 27 is a fragmentary view on an enlarged scale illustrating one method by which the hydraulic cylinder shown in Fig. 27 may be secured to the inside of the column.

Fig. 28 is a horizontal section substantially on the line 28—28 of Fig. 27.

Fig. 31 is a view, partly in elevation and partly in vertical section showing my improved means for tensioning and holding the bracing cables.

Figs. 32 and 33 are fragmentary vertical sections showing how the bracing cables are guided around the edges of or through the operating platform.

Fig. 34 is a side elevation showing a fragment of a column with a fairwater mounted thereon; and Fig. 35 is a horizontal section substantially on the line 35—35 of Fig. 34.

Figure 2:
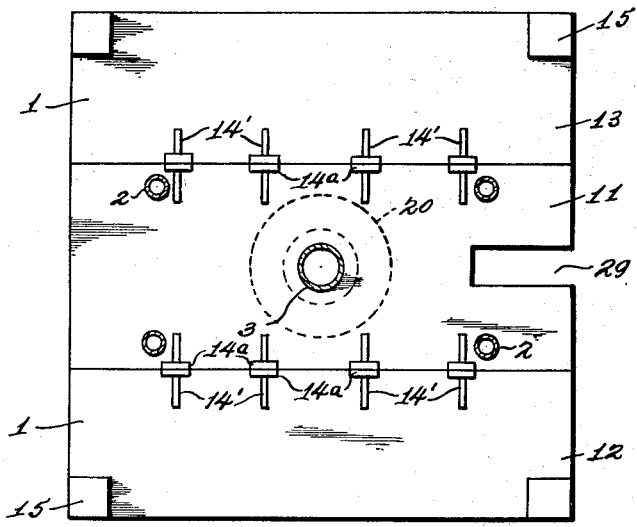
Fig. 2 is a similar view showing a modified construction.
Figure 1:
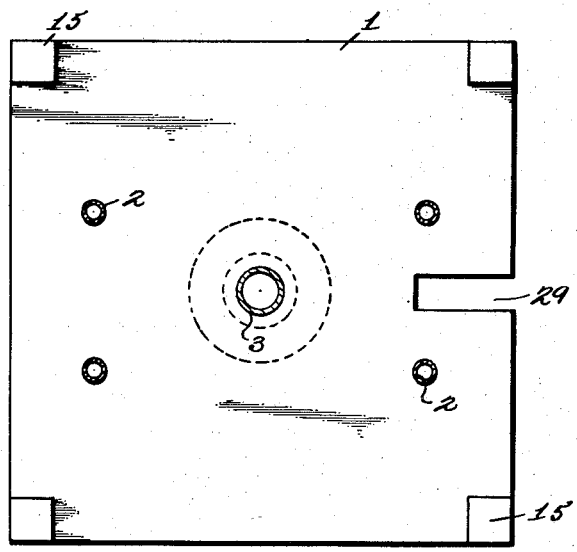
Fig. 1 is a plan view of one form of ground anchor barge, with the columns shown in section.
Figure 3:
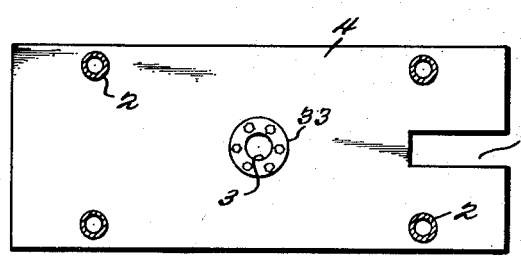
Fig. 3 is a plan view of the operating platform or supporting barge.

Referring to the drawings in detail and more particularly first to Figs. 1 to 5 inclusive, my improved drilling unit comprises a ground anchor barge 1 as shown in Fig. 1 and a platform barge 4, as shown in Fig. 3 connected by a plurality of trunk columns 2 and 3.

In these figures of the drawing five such trunk columns are illustrated, namely four columns 2 arranged at the corners of a rectangle and a single central column 3, shown as slightly larger than the column 2.

These columns are in the nature of hollow tubular members, and while I have shown them as of circular cross section, they may of course be of any other desired shape such as square.

By reference to Figs. 1 and 3 it will be seen that the ground anchor barge is of substantially greater area than the platform or operating barge 4. This is for the purpose of providing greater stability to the structure.

While in my prior patent, above referred to I have illustrated a ground anchor structure consisting of a plurality of separate barges spaced a substantial distance apart, in my present design the ground anchor barge consists of a single rigid structure.

Where the drilling unit is to be used in relatively deep water such as 75 to 100 feet, the ground anchor barge must necessarily be of enormous size, in order to afford the desired stability. There is however a practical limit to the size of these barges since, if they are too large, they cannot be accommodated in any existing dry dock, as is sometimes necessary, for repairs. Consequently when conditions are such that the ground anchor barge must be larger than can be accommodated in any available dry dock, I construct the ground anchor barge of a plurality of separately fabricated units such as indicated at 11, 12 and 13 in Fig. 2, these units being disposed side by side, in substantial contact, and suitably connected or joined to form a rigid structure.

Two possible methods of joining these sections are illustrated in Figs. 6, 7 and 8. In Figs. 6 and 7 triangular brackets 14 are welded to the adjacent sections and to these brackets and to the barge sections themselves are secured pairs of interlocking lugs 16, through each of which pairs extends a bolt 16$^a$.

In Fig. 8 a slightly different construction is illustrated. In this construction, the brackets 14' have laterally extended flanges 14$^a$, and when assembled, these flanges abut and are secured together by means of bolts 16'. Similar bolts unite the abutting edges of the sections 11 and 12 of the barge.

The ground anchor barge above described and illustrated either in Figs. 1 or 2 consists of a hollow watertight structure having a top wall 1$^b$ and a bottom wall 1$^a$ as shown in Figs. 9, 10 and 11. In Figs. 9 and 10 the trunk columns 2 are shown as extending between the top and bottom walls of the barge and welded thereto. The lower end of the columns may be open as shown in Fig. 9, in which case they would be filled with water when the barge is submerged, or they may be closed at the bottom as shown in Fig. 10, in which case they would be filled with air and would add to the buoyancy of the unit.

In Fig. 12 I have illustrated the single column 3 secured to the barge in the manner illustrated in Fig. 10. This single column 3 is surrounded by two concentric circular partitions 19 and 20 which form annular airtight chambers 18 and 17.

While in Figs. 11 and 12 the column 3 is illustrated, for simplicity, as of the same size as column 2 in Figs. 9 and 10, it would probably in practice be somewhat larger as shown in Figs. 4, 5 and 13.

Secured to the top of the ground anchor barge adjacent its outer edges are a plurality of wing tanks 15. Each of these tanks is preferably divided into several compartments as indicated at $a$, $b$, and $c$ in Figs. 4 and 5. While, in Figs. 1 and 2, these wing tanks are shown as located at the corners of the ground anchor barge they may be located at any other point along the side edges thereof. The purpose of these wing tanks is to increase the stability of the drilling unit while the ground anchor barge is being submerged. During the first stages of submergence these tanks are filled with air so as to exert a buoyant force on the ground anchor barge, while, as the ground anchor barge sinks and approaches the ocean bottom, water may be admitted to these wing tanks in order to increase the weight and lower the center of gravity of the unit.

In order to secure the ground anchor barge firmly to the ocean bottom, spuds or piles 21 may be driven down through openings in the barge as illustrated in Figs. 4 and 5. These spuds or piles may be located inside of the trunk columns as in my said prior patent.

Figure 17:
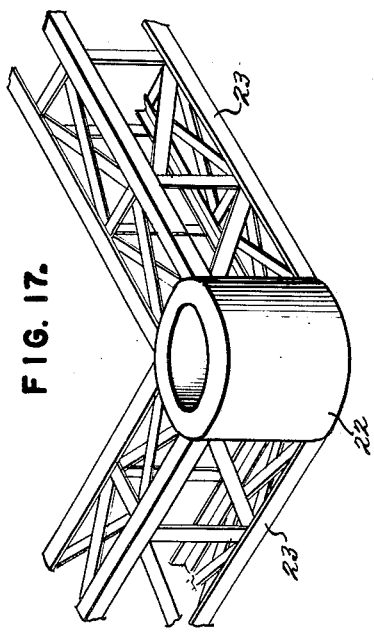
Fig. 17 is a fragmentary perspective view on an enlarged scale showing one of my improved buoyant sleeves which are slidably mounted on the columns and between which sleeves is connected rigid trussed bracing.
Figure 18:
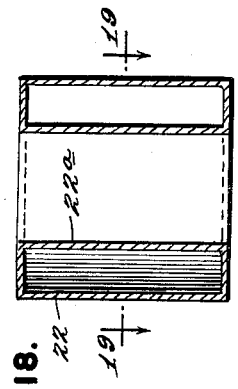
Fig. 18 is a vertical sectional view through one of the buoyant sleeves.
Figure 19:
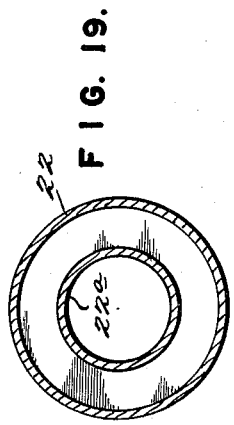
Fig. 19 is a transverse section through the same substantially on the line 19—19 of Fig. 18.

One of the important features of the present invention is the provision of sleeves 22 surrounding and capable of sliding freely on the trunk columns. A plurality of such sleeves are illustrated in Figs. 4 and 5, and the details of one of them are shown in Figs. 17, 18 and 19. As illustrated in these latter figures each sleeve is formed with an inner cylindrical wall 22$^a$ spaced from the outer wall so as to provide between the two walls a sealed annular chamber. The parts are so proportioned, that this chamber, containing air, renders the sleeve buoyant, so that it will float.

Where a plurality of columns is employed as in Figs. 4 and 5, one of these buoyant sleeves surrounds each of four columns and the sleeves themselves are rigidly connected by truss framing 23. This framing therefore constitutes a rectangular structure with a buoyant sleeve 22 at each corner, and the truss framing constitutes rigid bracing means extending between the various columns.

In Figs. 4 and 5 two sets of buoyant sleeves 22 and truss framing 23 are shown, one above the other, so as to brace the columns at two different points in their height.

In addition to the truss framing the pairs of sleeves 22 are connected by pairs of diagonally extending cables or guy lines 24, and the sleeves may also be connected with the wing tanks 15 or other points of the ground anchor barge by means of cables or guy lines 26 and 27. Additional cables 25 extend upwardly from the uppermost sleeves 22 through the platform barge 4.

It will be understood that the sleeves 22 are so buoyant that they will sustain not only their own weight, but also the weight of the truss framing and cables.

Figure 29:
Figs. 29 and 30 are details illustrating means for attaching the bracing cables shown in Figs. 20 to 22 to the sliding sleeves or other parts of the unit.
Figure 30:
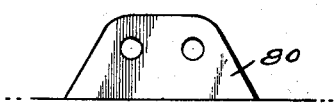

For connecting the cables to the sleeves or wing tanks I may employ lugs 79 and 80, as shown in Figs. 29 and 30, the former for use with a single cable, the latter with two cables.

In order to accommodate a drill stem and casing, the ground anchor barge 1 and the platform barge 4 are provided with notches 29 and 30 respectively, as best shown in Figs. 1 and 3, and as indicated in Fig. 5.

As in my said prior patent the platform barge 4 is slidably mounted on the columns 2 and 3.

Suitable means are provided for hoisting the platform barge above the water $x$ into the positions shown in Figs. 4 and 5, and a feature of the invention is the provision of improved means for holding the platform barge in its elevated position. Referring more particularly to Figs. 25 and 26 it will be seen that the platform barge is provided with guide sleeves 31 extending through the same and formed at their upper ends with a laterally extending annular flange 32. Each column extends freely through one of these guide sleeves and carries at its upper end a similar flange 33. When the platform barge has been raised to its uppermost position these two flanges come into contact and may be strongly secured together as by means of bolts 34. Thus the platform barge is permanently supported on the columns.

For raising the platform barge to its uppermost position I have devised improved hydraulic means as illustrated in Figs. 26 to 28. Referring to these figures I have shown a hydraulic cylinder 35 secured to the inside of a column. One way of securing this cylinder is illustrated in Figs. 27 and 28. As shown in these figures a bracket 36 is welded or otherwise secured to the side of the cylinder, while a similar bracket 37 is secured to the inside of the column. These brackets are brought into contact and strongly connected by means of bolts 38.

A piston 35$^a$ works in the cylinder 35 and is carried by a piston rod 35$^b$, connected to a cable 39 which passes up through the column and over a pulley 40 at the upper end thereof, and is secured to the platform barge 4 as by means of a lug 41. It is obvious by admitting fluid under pressure to the upper end of the cylinder 35, the piston will be forced downwardly, thus lifting the platform barge. When it is desired to lower the platform barge, this may be done by permitting fluid to escape slowly from the upper end of the cylinder.

In Figs. 4 and 5 I have illustrated a conventional drilling rig or derrick 42 as mounted on the operating platform 4 near the edge thereof and in such position that the drill stem and casing may pass downwardly through the notch 30 in the operating platform and through the notch 29 in the ground anchor barge. In Fig. 4 I have also illustrated, at the other end of the platform barge, a helicopter landing platform 43, and crew accommodations 43$^a$.

In Figs. 20 and 21 I have illustrated a drilling unit employing only a single column 3. The drilling rig or derrick 42' is mounted centrally of the operating platform directly over this column. Because of this, I employ a special "jack-knife" type of derrick which is pivoted at one side of its base, as indicated at 44 in Fig. 20 so that it may be folded over into dotted line position, to permit the platform barge to move downwardly over the column. Or, it would probably be more accurate to say that when the drilling unit is being assembled the derrick occupies the position shown in dotted lines, with the column extending up at one side thereof. Then after the platform barge has been raised to its final operating position the derrick is set up into full-line position.

In the central column arrangement shown in Figs. 20, 21 and 22 I may employ the same buoyant sliding sleeve 22 as described in connection with the preceding figures. This sliding sleeve may be connected by bracing means such as cables or guy lines 25 and 26 to the wing tanks and to the platform barge, and additional cables 28, connected to the wing tanks may also be employed.

Figure 22:
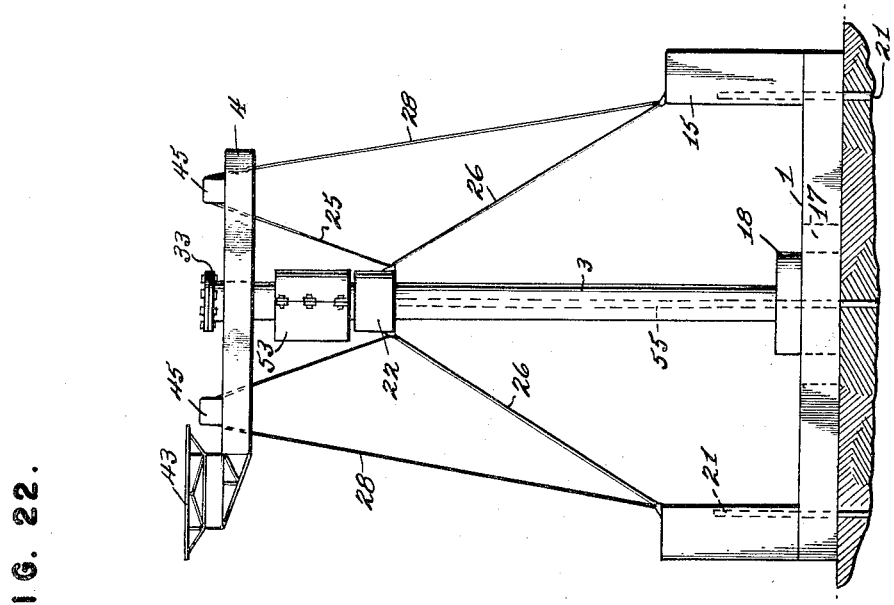
Fig. 22 is a view similar to Fig. 20 but showing a drilling unit in which no conventional derrick is employed.

In Figs. 4 and 5 as well as in Figs. 20 to 22 I have illustrated the cables or guy lines such as 25 and 28 as passing up through the platform barge 4 to an element indicated in square outline as 45. This element is shown in detail in Fig. 31. It consists of a housing in which is mounted a motor 46 connected by a belt to a hoisting drum or winch 47. A strong abutment 48 is secured to the platform barge and a cable such as 25 passes through this abutment. A stop block 49 may be fitted over and secured to the cable. When the winding drum 47 is operated the cable is drawn in to the desired extent, and the stop block 49 then clamped to the cable to hold it under the desired tension. When it is necessary to release or pay out the cable, the stop block is removed and the winding drum 47 reversed.

It will be understood that tensioning mechanism of this character may be used in connection with any of the bracing cables or guy lines employed.

In Fig. 33 I have illustrated how a cable such as 25 can be led up through the platform barge 4 to the tensioning device 45. In this figure I have shown a section of pipe 50 extending from top to bottom of the platform barge, and the cable passes freely through this pipe. At the upper end of the pipe may be placed a rounded protector 51 to prevent the cable from being damaged by sharp edges.

In Fig. 32 I have shown how a cable such as 52 may be passed around the edge of the platform barge to the tensioning device, wherever this is necessary.

In Figs. 4 and 5 and 20 to 22 I have shown, surrounding each column at the water level, what is called a fairwater 53. The construction of this device is clearly shown in Figs. 34 and 35. It consists of a streamlined structure made in two sections secured together by bolts 54 and constructed to rotate and slide freely on the column. This fairwater is of course buoyant and floats at the water level. By virtue of their streamlined shape and free rotation they serve to minimize the force of waves acting on the columns.

The operation of the unit shown in Figs. 1 to 5 will now be briefly described, reference being had particularly to Figs. 14, 15 and 16. The unit is first assembled in the condition shown in Fig. 14, in which the ground anchor barge 1 is afloat and has sufficient buoyancy to support the superstructure. The buoyancy of the ground anchor barge is of course due to the fact that it contains a large amount of air.

The unit, in the condition shown in Fig. 14 is floated out to the desired location and then water is admitted to various compartments in the ground anchor barge until it begins to sink, as shown in Fig. 15. At this point the platform barge 4, which, of course is buoyant, begins to float, and as the ground anchor barge continues to sink the columns slide downwardly through the floating platform barge, until, when the ground anchor barge reaches and rests upon the bottom, the platform barge floats on the surface of the water while the columns project a substantial distance above the water as shown in Fig. 16.

As the ground anchor barge and columns sink the buoyant sleeves 22 float upwardly on the columns, carrying the bracing 23 and 24 with them, until they reach the position shown in Fig. 16. In other words the columns 2 slide freely downwardly through the buoyant sleeves as the latter float in the water, their final position being determined by the cross cables or guy lines 24. After the unit has been well anchored on the bottom and secured in position by means of the spuds 21 the platform barge 4 may be hoisted to its final uppermost position, above the water as shown in Figs. 4 and 5, by means of the hydraulic cylinder 35, shown in Fig. 26 and firmly secured in such final position by means of the bolts 34 as shown in Fig. 25.

For raising and floating the unit, when it is desired to move same from its grounded position shown in Fig. 4, the above described operations are carried out in reverse order, i.e., the water is pumped out of the tanks of the ground anchor barge and air admitted, as described in my said prior patent.

While I have shown and described the sleeves 22, carrying the truss framing 23, as buoyant, the invention is not necessarily limited to buoyant sleeves. These may if desired be made simply as non-bouyant solid sleeves, In this case they of course will not float upwardly as the columns sink but would have to be hoisted. Such hoisting of the sleeves and framing, from the position shown in Fig. 15 to that shown in Figs. 16, 4 and 5, can be accomplished by means of the tensioning mechanism 45, shown in Fig. 4, through the medium of the cables 25. In other words, the invention contemplates broadly the provision of sleeves carrying the truss framing and slidable on the columns, whether or not these sleeves are buoyant.

While in Figs. 4 and 5 I have illustrated a drilling derrick so located that the drill stem and casing can operate through the notches 29 and 30, in Figs. 20 and 21 I place the drilling derrick directly over the column 3 so that the drill stem and casing operates down through this column as indicated at 55. In this case it will be understood that the drill casing passes through a stuffing box 56 at the bottom of the column, and through an opening in the bottom 1ᵃ of the ground anchor barge, as shown in Fig. 11.

Under certain circumstances it may be desirable to have the drill stem and casing extend at an angle as shown in broken lines in Fig. 13, and in this case additional stuffing boxes may be located to one side or the other as shown at 56ᵃ and 56ᵇ.

In Fig. 22 I have illustrated a drilling unit similar to that shown in Figs. 20 and 21, but in which no derrick is employed. In this arrangement the drilling mechanism is contained completely inside of the column itself, as shown in detail in Figs. 23 and 24.

In these figures I have illustrated the chamber 18 as extending above the top of the ground anchor barge 1 and as braced by suitable framing 18'. The chamber is divided by a partition 57 into upper and lower compartments. In the upper compartment is located a drill hoisting mechanism 58, and from this extends a cable 59 up through the column 3 to and around a sheave 60 supported by a crown block beam 61 and thence around another sheave 62 which is attached to the upper end of the drill stem 55ᵃ. This drill stem extends on down through the partition 57, which supports the usual rotary table 64, for turning the drill stem, and on down through a blow-out preventer 65, in the lower compartment. The drill casing 55 extends from a point below the blow out preventer down through a stuffing box 56 secured to the bottom of the barge as in Fig. 11. Mud pumps 69 may also be located in the upper compartment and heavy power machinery mounted in the lower compartment as indicated at 70. This helps to lower the center of gravity and to stabilize the unit.

Platforms 63 may be placed at suitable points in the height of the column, and preferably one or more elevator shafts 66 are also built inside of the column to afford access from the top of the column to the chamber 18. An emergency ladder 67, is also preferably provided inside of the column and on either side of the elevator shaft or shafts, at the lower end of the column are storage spaces 68 for drill pipe sections. Thus a complete drilling outfit is housed entirely within the column 3 and chamber 18 in such a manner as to be accessible from the operating platform at the top of the column.

What I claim is:

1. In a floating unit for subaqueous drilling, the combination with a submersible ground anchor barge, of a rigid column secured thereto and extending upwardly therefrom, and a platform barge slidably mounted on said column, means for raising said platform barge on said column, means for securing said platform barge to said column at the desired height, and a sleeve surrounding and slidable on said column, bracing cables connected at one end to said sleeve and at the other end to said ground anchor barge, other cables extending from said ground anchor barge and from said sleeve to a point above said platform barge, and means on said platform barge for tensioning all of said cables.

2. In a floating unit for subaqueous drilling, the combination with a submersible ground anchor barge, of a single column rigidly secured thereto and extending upwardly therefrom, a platform barge slidably mounted on said column, means on said column for raising said platform barge, means for supporting said platform barge wholly on said single column, a stuffing box set in the bottom of said ground anchor barge beneath said column, a drill stem and casing extending downwardly inside of said column and passing through said stuffing box, and means for raising and lowering and for rotating said drill stem, said means including a derrick mounted on said platform barge immediately over the upper end of said column and pivoted at its lower end to said platform barge so that it may be folded over to one side of said column to permit relative vertical movement of said column and platform barge.

3. In a floating unit for subaqueous drilling, the combination with a submersible ground anchor barge, of a rigid column secured thereto and extending upwardly therefrom, a platform barge supported by said column, and a buoyant fairwater, streamlined in horizontal section, freely having a vertical opening loosely fitting said column and rotatable and slidable on said column below said platform barge.

4. In a floating unit for subaqueous drilling, the combination with a submersible ground anchor barge having a watertight chamber therein, of a column rigid with and extending upwardly from said chamber, the lower end of said column opening into said chamber, a drill stem extending downwardly inside of said column and through said chamber, a drill hoisting mechanism located in said chamber adjacent said drill stem, a sheave secured to the upper end of said drill stem, a second sheave supported in said column above said drill stem, and a cable extending from said hoisting mechanism up inside said column and around said sheaves.

References Cited in the file of this patent

UNITED STATES PATENTS

| | | |
|---|---|---|
| 57,881 | Drouillard | Sept. 11, 1866 |
| 1,321,060 | Kunisawa | Nov. 4, 1919 |
| 2,187,871 | Voorhees | Jan. 23, 1940 |
| 2,399,656 | Armstrong | May 7, 1946 |
| 2,475,933 | Woolslayer et al. | July 12, 1949 |
| 2,534,480 | Shannon | Dec. 19, 1950 |
| 2,574,140 | Boschen | Nov. 6, 1951 |
| 2,589,146 | Samuelson | Mar. 11, 1952 |
| 2,628,818 | Graham | Feb. 17, 1953 |
| 2,651,181 | Alcorn et al. | Sept. 8, 1953 |
| 2,684,575 | Pryor et al. | July 27, 1954 |
| 2,691,272 | Townsend et al. | Oct. 12, 1954 |
| 2,699,321 | Nelson | Jan. 11, 1955 |
| 2,756,021 | Townsend et al. | July 4, 1956 |
| 2,777,669 | Willis et al. | Jan. 15, 1957 |
| 2,783,970 | Gillespie | Mar. 5, 1957 |
| 2,837,897 | Nedderman et al. | June 10, 1958 |